3,395,236
COMPOSITION COMPRISING OLEIC ACID, POLYETHYLENE GLYCOL, AND GELATIN FOR TREATING NAIL INFECTIONS
Cleveland J. White, 6525 North Ave., Chicago, Ill. 60635
No Drawing. Continuation-in-part of application Ser. No. 773,148, Nov. 12, 1958. This application Sept. 28, 1961, Ser. No. 141,295
1 Claim. (Cl. 424—360)

This is a continuation-in-part of my co-pending application, Ser. No. 773,148, filed Nov. 12, 1958, and now abandoned.

This invention relates to novel unctuous preparations adapted for external application in the treatment of ringworm, fungal infections and other disorders of the skin, fingernails and toenails. More particularly it relates to a composition capable of deep penetration into diseased skin and nail tissue, and of carrying fungicides and other therapeutic ingredients to the locus where fungi and other disease organisms have penetrated.

The therapeutic treatment of the skin, fingernails and toenails infected with ringworm and other fungal infections is extremely difficult and frequently not very effective because of the inability of the ointment, solutions and the like customarily used as carriers of fungicides, to really penetrate into the skin, fingernails and toenails and reach the situs of infection.

The compositions of the present invention provide a highly effective means for treatment of the aforesaid disorders of the skin, fingernails and toenails. Besides having beneficial effects in the case of infections of the skin, fingernails and toenails the applicant's compositions have exhibited gratifying results in the treatment of cracked or fissured nails.

Generally speaking these compositions may comprise fatty acids, and especially unsaturated fatty acids such as oleic and linoleic acids, a polyhydric alcohol such as polyethylene glycol of viscous consistency, or propylene glycol; a nitrogen source as, for example, gelatin, a natural amino acid, for example an amino acid derived from gelatin, amino acids generally, polypeptides, urea, and also contains in its most preferred form vitamins A and D, and a surface active agent such as lauryl sulfate.

By way of illustrating a number of embodiments of this invention the following examples are presented herewith, it being understood that these are for illustrative purposes only and not to be construed in a limiting sense.

EXAMPLE 1

60 parts of oleic acid, 35 parts of polyethylene glycol (Carbowax 400) and 5 parts of gelatin are mixed thoroughly, under mild heat, until the mixture is substantially homogeneous, and is then allowed to set at about 40° F.

Using the above composition as a base, fungicides and other compositions used in the treatment of ringworm of the nails can be added thereto, these including, typically, sodium hyposulfite, thymol, sodium caprylate and undecylenic acid. In the above composition, hydrolyzed gelatin may be substituted for the recited gelatin if desired.

A modification of the foregoing is set out in Example 2 below:

EXAMPLE 2

60 cc. of Neofat[1] #140, 35 cc. propylene glycol, U.S.P., 3 cc. Drisdol w/A (a propylene glycol solution of vitamins D and A produced by Winthrop Laboratories of New York), 20 mg. urea and 2 cc. of Stepanol WAT (lauryl sulfate produced by the Stepan Chemical Company of Chicago), were mixed as follows:

The unsaturated fatty acids (Neofat #140) and the propylene glycol were thoroughly mixed at room temperature for 15 minutes in an electric mixer; to this was added the lauryl sulfate and the resulting mixture mixed for 10 minutes. Following this the powdered urea was gradually added and mixed for another 5 minutes, after which the Drisdol w/A was added.

The penetrating ability of the compositions of the examples, which was surprising and unexpected, was observed and its extent determined after use of these compositions had resulted in many excellent clinical results in nail diseases—splitting and fissuring nails—in which no etiological agents have been discovered or determined.

The unusual penetrating ability of the compositions of this invention were demonstrated using normal nails of live persons. In these demonstrations inorganic iodine was used as a tracer, the particular iodine-containing preparation being a strong tincture of iodine N.F. containing 7% iodine, 5% potassium iodide and 18% alcohol. The alcohol-free composition was incorporated—in the same strength—in the composition of Example 2.

The large toenails of the test subjects were painted at least five times with the preparation, the tincture of iodine alone being applied to one toenail and the composition of Example 2 plus the iodine-iodide being applied to the other toenail. In the case of the toenails painted with the strong tincture of iodine there was no penetration in ten days to two weeks, while in the case of the other toenails penetration of iodine through the whole nailplate was complete.

The incorporation of fungicides into the compositions of Examples 1 and 2 resulted in a therapeutic medium which produced excellent results in the treatment of onychomycosis caused by *Trichophyton gypseum*, a superficial invader of both finger and toe nails.

In the case of deep-seated infections due to *Trichophyton rubrum* the use of the compositions of Examples 1 and 2 to which had been added fungicides resulted in the obtention of good therapeutic results in approximately two-thirds of the cases. The results of the treatments were confirmed not only by clinical examination but also by

---

[1] Identified in the commercial literature as "Crystallized Distilled Cottonseed"—super alkyd grade of fatty acids, with the following characteristics and composition:

| | |
|---|---|
| Titer, ° C. | 5.0 |
| Iodine value | 138–145 |
| Acid value | 195–200 |
| Color Lovibond (max.) | 3 Gardner |
| Moisture (max.) | 0.5 |
| Heat stability (G.E. Heat Test) __hrs__ | 11 |
| Saponification value | 195–201 |
| Unsaponifiables (max.) | 1.0 |
| Myristic C–14 _____percent__ | 1.0 |
| Palmitic C–16 _____do____ | 4.0 |
| Palmitoleic C–16 _____do____ | 1.0 |
| Oleic C–18 _____do____ | 34.0 |
| Linoleic C–18 _____do____ | 59.0 |
| Linolenic C–18 _____do____ | 1.0 | repeated histological examination of the nails for any possible residual fungi.

Other types of nail infections besides those due to the Trichophyton included cases due to yeast fungi—so-called *Candida albicans*. In these cases the organisms were found embedded in the nailplate. Treatment of these infections with the applicant's penetrating compositions containing sodium caprylate produced excellent results.

Where *Straphylococcus aureus* was found in the nailplate and it was determined that that bacteria was the etiologic agent, Furacin was incorporated in the applicant's composition with good results. The combination of treatment of the infection with such Furacin-containing compositions accompanied by oral ingestion of Furadantin was even more efficacious.

As earlier mentioned, use of the compositions of this invention, even without the addition of fungicides, was found to give gratifying results in the treatment of splitting and fissuring of the fingernails, this being a common malady in women, where no etiological factors such as irritation from detergents, or some metabolic disorder such as hypothyroidism could be ascertained. Nightly applications for three or four weeks resulted in excellent results even in cases where the condition had been active for many years.

I claim:
1. A penetrating composition for treating nail infections comprising about 60% oleic acid, about 35% polyethylene glycol (molecular weight 400), and about 5% gelatin, all parts by weight.

References Cited

UNITED STATES PATENTS

| 2,459,566 | 1/1949 | Lee | 167—82 |
| 2,666,013 | 1/1954 | Ferguson | 167—63 |

OTHER REFERENCES

McClelland et al., Chemical & Engineering News, vol. 23, No. 3, pp. 247–251, Feb. 10, 1945.

Meyers et al., J. Am. Pharm. Assoc., vol. 38, pp. 231–4 (1949).

Lesser, Drug and Cosmetic Industry, vol. 69, No. 3, pp. 316, 317, 378, 379, 396 to 401, September 1951.

Chemical Abstracts, vol. 48, entry 10223e, 1954 (citing Butcher, J. Invest. Dermatol., 21, 43–8, 1953).

Chemical Abstracts, vol 48, entry 13848g, 1954 (citing Montagna, Proc. Soc. Exptl. Biol. Med., 86, 668–72, 1954).

Brown, Quarterly Journal of Pharmacy and Pharmacology, vol. 8, pp. 392–3 (1935).

Butcher, J. Invest. Dermatol., vol. 21, pp. 43–48, 1953.

Montagna, Proc. Soc. Exptl. Biol. Med., vol. 86, pp. 668–672, 1954.

White et al., Industrial Medicine and Surgery, vol. 27, pp. 325–327, July 1958. (Paper originally presented at the 70th Ann. Mtg. of the Amer. Asso. of Railway Surgeons, Apr. 18, 1958.)

RICHARD L. HUFF, *Primary Examiner.*